United States Patent Office 3,637,658
Patented Jan. 25, 1972

3,637,658
PROCESSING RDX AND HMX
Sam B. Wright and Julius T. Rogers, Kingsport, Tenn., assignors to the United States of America as represented by the Secretary of the Army
No Drawing. Filed Nov. 26, 1968, Ser. No. 779,262
Int. Cl. C07d 55/16, 55/60
U.S. Cl. 260—239 HM
3 Claims

ABSTRACT OF THE DISCLOSURE

Recovery of HMX in good concentrations is achieved from RDX-HMX admixtures by preferential crystal growth of RDX in spent acid and subsequent separation of the fine crystals of HMX by physical methods. The spent acid will normally comprise 60 to 86% acetic acid, 1 to 2% nitric acid, 1 to 3% formic acid and 1 to 2% ammonium nitrate.

---

The invention described herein may be manufactured, used and licensed by or for the Government for governmental purposes without the payment to us of any royalties thereon.

This invention relates to explosive compositions and more particularly concerns improved processes for recovering cyclotetramethylenetetranitramine (hereinafter referred to as HMX) from cyclotrimethylenetrinitramine (hereinafter referred to as RDX).

HMX may be prepared by the nitrolysis of hexamethylenetetramine by nitric acid and ammonium nitrate in the presence of acetic anhydride. However, the HMX prepared by this method is contaminated with a substantial proportion of RDX. Heretofore, separation of HMX-RDX mixtures has been difficult because the physical properties of these homologous compounds are similar. For example, they both have similarly low solubilities in most of the common organic solvents, e.g. acetone, acetonitrile, butyl acetate, toluene, butyl alcohol, and the like. The density of RDX is about 1.8 g./cc. as compared to a density of about 1.9 g./cc. for beta HMX. Although both are resistant to many organic compounds, the destruction of both RDX and HMX by sodium hydroxide and strong nitric acid, for example, are comparable. Additionally, the wettability of both RDX and HMX by water is poor as judged by contact angles of 35 to 45°.

Thus, a simple, economical process whereby these two valuable explosive compounds might be separated is needed.

Accordingly, it is a broad object of this invention to provide improved processes for separating HMX from RDX.

Another object of the invention is to separate HMX from RDX without substantially changing the characteristics of either explosive.

Still another object of the invention is to provide HMX in purities suitable for further processing.

Yet another object of the invention is to obtain the stable beta polymorphs of HMX.

A further object of the invention is to provide processes for enhancing removal of spent acid and any associated impurities present in the production of RDX, from crude RDX.

A still further object of the invention is to provide processes whereby filterability of RDX is improved.

These and other objects and features of the invention will become apparent as the invention is more fully disclosed.

Briefly, and in accordance with these objects, by adding about 1 part RDX/spent acid to about 3 to 5 parts spent acid to form a slurry, then heating the slurry to about 100° C., holding the slurry at this temperature for about 15 to 60 minutes and then cooling incrementally to 80° C., to 60° C., to 30° C., to effect preferential crystal growth of the RDX, about 80% of the HMX in crude RDX in purities ranging between about 70 to 95° may be separated from the RDX by suitable methods.

The spent acid used throughout this invention will have an acid content of 60 to 86%, expressed as acetic acid with about 1 to 2% nitric acid, 1 to 3% formic acid, and 1 to 2% ammonium nitrate, the balance being water.

The aforementioned slurry will be maintained at about 100° C. for about 15 to 60 minutes, depending upon the time necessary for solution equilibrium to be attained. The slurry will then be cooled fairly slowly to about 80° C., maintained at this temperature for a period of about 3 to 5 minutes, cooled slowly again to about 60° C. and then to 30° C., the temperature being held at 60° C. and 30° C. for about 3 to 5 minutes each. The actual cooling time will normally depend on the quantity of material to be used, the material comprising the container, and the like. However, it is safe to state that the slurry is permitted to cool by exposing it to ambient conditions. This slow cooling of the slurry effects beneficial crystal growth of the RDX.

The HMX may then be separated from the RDX by suitable means including sedimentation/decantation and cyclone separation. Regardless of the method, the HMX will form the fine fraction of the recrystallized material. The ratio of the RDX/spent acid to spent acid may be 1 to 2 to 5 with 1 to 3 being preferred. Incremental cooling of the RDX/acid slurry may be varied over the range of about 100° C. to about 30° C. with increments of 80, 60, and 30° C. being preferred for optimum particle size distribution, as aforediscussed. The RDX—HMX resulting from the above processing may be characterized by a median diameter of about 120 to 150 microns with essentially 90 to 95% of the RDX having a particle size greater than about 70 to 80 microns, whereas about 70 to 80% of the HMX will have a particle size less than about 70 to 80 microns. The HMX purity of the fine fraction will vary from about 70 to 95%. Usage of HMX seed with a surface area of about 8,000 to 12,000 cm.$^2$/gm. may be used advantageously to minimize any crystal growth of HMX. The HMX seed may be added in quantities of about 5 to 50% based upon actual HMX content. RDX seed, having a surface area of about 300 to 1000 cm.$^2$/gm. may be added to the RDX/acid slurry when it attains about 95° C., and in quantities ranging between about 5 to 15% of the total RDX weight, which maximizes crystal growth of RDX.

The processes of our invention are further described and illustrated by a few examples presented hereinbelow:

EXAMPLE I

To about 3000 grams of RDX/spent acid slurry (480 grams RDX) analyzing about 62% acid, expressed as acetic acid, was added about 9000 grams of spent acid containing about 63% acid expressed as acetic acid. The mixture was heated to about 99 to 100° C. in about 30 minutes. After 30 minutes at this temperature, the mixture was cooled to about 78° C. to 80° C. over a period of 25 minutes and maintained at this temperature for 30 minutes. The mixture was then cooled to 60° C. in 20 to 25 minutes and held at 60° C. for one hour. The mixture was finally cooled to 30° C. in 30 to 35 minutes and held at 30° C. for 30 minutes. The solids were filtered, washed with water, and dried for analysis: Recovery of total solids: 99.8. HMX polymorph: beta.

PARTICLE SIZE DISTRIBUTION AND HMX ASSAY
[U.S. Standard Sieve]

| Number | Microns | Percent retained | HMX, percent |
|---|---|---|---|
| 50 | 297 | 0.3 | |
| 100 | 149 | 10.9 | 2.4 |
| 200 | 74 | 74.3 | 7.0 |
| 325 | 44 | 5.9 | 14.7 |
| −325 | −44 | 8.6 | 86.4 |

EXAMPLE II

The RDX/spent acid slurry was treated substantially as described under Example I. The mixture however was agitated, with a turbine type agitator, for example, throughout the heating and cooling process, the latter involving a low temperature of 37° C. in place of the 30° C. of the aforementioned example. Filtering of the solids was eliminated in this example. The suspended solids were allowed to settle after cessation of agitation. After about two minutes of settling, 3 fractions of liquid/solids were removed using vacuum draw-off techniques. The fractions were filtered, dried, and analysis is as follows:

| | | Percent of— | | |
|---|---|---|---|---|
| | Fraction, weight grams | HMX | Recovery of HMX in each fraction | Recovery of HMX (cumulative) |
| Fraction Number: | | | | |
| 1 | 5.5 | 91.74 | 12.4 | 12.4 |
| 2 | 29.5 | 76.50 | 55.4 | 67.8 |
| 3 | 7.3 | 82.50 | 14.8 | 82.6 |

EXAMPLE III

To about 2800 grams RDX/spent acid slurry (450 grams RDX) was added about 8200 grams spent acid to form a mixture. The spent acid analyzed approximately 62% acid, expressed as acetic acid. The mixture was heated to about 100° C. and held thereat for about 30 minutes. The mixture was cooled to about 80° C. in 20 minutes and held at this temperature for 30 minutes and then coled to about 60° C. in 30 minutes and held at 60° C. for 60 minutes. The slurry was finally cooled to 30° C. in about 30 to 35 minutes and maintained at 30° C. for 30 minutes. The solids were filtered, water washed, and dried for analysis:

| HMX Fraction U.S. Standard Sieve | HMX recovery, percent | Cumulative percent HMX, recovery |
|---|---|---|
| 100/200 | 43.1 | |
| 200/325 | 22.1 | 65.2 |
| 325/00 | 14.4 | 79.6 |

| | Median diameter, microns | |
|---|---|---|
| | RDX | HMX |
| Before treatment | 57 | 55 |
| After treatment | 125 | 73 |
| Percent increase in median diameter | 119 | 24 |

It is apparent from the above that our processes possess certain distinct advantages:

(1) Crystal growth of RDX is effected in spent acid requiring that only 2 to 5 parts of spent acid be added to a normal hydrous acid/crude RDX slurry.

(2) RDX and HMX are substantially unaffected by processing in the spent acid.

(3) The efficiency of recovery of HMX from RDX using sedimentation and decantation techniques vary from about 67 to about 83%.

(4) HMX assays of about 70 to 95% are obtained by the subject process, using RDX/HMX admixtures of nominal 90/10 composition.

(5) The particle size of RDX is characterized by a median diameter of about 125 to 150 microns which enhances recovery of RDX by filtration or cyclone separation/filtration since the finer HMX can be separated physically therefrom.

(6) RDX may be processed further by recrystallization after only a simple treatment of a water-wash to remove excess acid.

(7) HMX may be recovered from the spent acid by filtration, water washed to remove excess acid and recrystallized for further processing.

We claim:

1. A process for recovering HMX from an RDX-HMX admixture in good concentrations and comprising the steps of:

adding crude RDX-spent acid slurry from nitrolysis of hexamine to additional spent acid from said nitrolysis to form a mixture, heating said mixture to a temperature of about 100° C. and maintaining said temperature for about one-half hour, cooling the heated mixture slowly to effect preferential growth of RDX crystals, said RDX crystals being coarser than the finer HMX crystals, physically separating the coarser crystals from the finer crystals by physical means, filtering the finer crystals/spent acid to recover the HMX-rich product, and filtering the fine crystals/spent acid to recover the RDX-rich product, said spent acid consisting essentially of acetic acid, water, and nitric acid, formic acid and ammonium nitrate.

2. The process as described in claim 1 wherein said spent acid consists essentially of about 60 to 86% acid, expressed as acetic acid, and wherein said RDX-spent acid slurry comprises about 480 grams RDX and about 2520 grams of said spent acid, wherein said additional spent acid comprises about 9000 grams, wherein said cooling steps comprise lowering the temperature of said heated mixture from about 100° C. to about 78 to 80° C. for a period of about 30 minutes, further reducing the temperature to about 60° C. in a period of about 1 hour, still further cooling the temperature of said reduced temperature mixture to about 30° C. in a period of about 30 to 35 minutes, and maintaining the temperature at 30° C. for about ½ hour.

3. The process of claim 1 further characterized by adding immediately prior to said cooling step a quantity of HMX seed having a surface area of about 8,000 to 12,000 cm.²/gm. to minimize crystal growth of HMX, said HMX seed being present in an amount ranging between about 5 to 50% of the actual HMX content.

References Cited

UNITED STATES PATENTS 3,133,054  5/1964  Wright et al. _____ 260—239

ALTON D. ROLLINS, Primary Examiner

U.S. Cl. X.R.

260—248 NS